(12) United States Patent
Masuda et al.

(10) Patent No.: US 11,038,158 B2
(45) Date of Patent: Jun. 15, 2021

(54) METHOD FOR MANUFACTURING A BINDER COMPOSITION FOR LITHIUM-ION SECONDARY BATTERY ELECTRODE

(71) Applicant: ZEON CORPORATION, Tokyo (JP)

(72) Inventors: Azusa Masuda, Tokyo (JP); Hiroki Oguro, Tokyo (JP); Kouichirou Maeda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/502,382

(22) Filed: Jul. 3, 2019

(65) Prior Publication Data

US 2019/0334159 A1   Oct. 31, 2019

Related U.S. Application Data

(63) Continuation of application No. 15/523,484, filed as application No. PCT/JP2015/079939 on Oct. 23, 2015, now abandoned.

(30) Foreign Application Priority Data

Nov. 18, 2014   (JP) ................................. 2014-233361

(51) Int. Cl.
| | | |
|---|---|---|
| *H01M 4/04* | (2006.01) | |
| *H01M 4/62* | (2006.01) | |
| *C08F 2/44* | (2006.01) | |
| *C08F 2/22* | (2006.01) | |
| *C08F 10/00* | (2006.01) | |
| *C08F 287/00* | (2006.01) | |
| *H01M 10/0525* | (2010.01) | |

(52) U.S. Cl.
CPC ............ *H01M 4/0466* (2013.01); *C08F 2/22* (2013.01); *C08F 2/44* (2013.01); *C08F 10/00* (2013.01); *H01M 4/62* (2013.01); *C08F 287/00* (2013.01); *H01M 10/0525* (2013.01)

(58) Field of Classification Search
CPC ........ H01M 4/04; H01M 4/62; H01M 4/0466; H01M 10/0525; C08F 10/00; C08F 2/22; C08F 2/44; C08F 287/00; C08F 212/08; C08F 220/18; C08F 220/14; C08F 2220/1825

See application file for complete search history.

(56) References Cited

U.S. PATENT DOCUMENTS

| | | | | |
|---|---|---|---|---|
| 5,618,883 A | * | 4/1997 | Plamthottam .......... | C09J 123/16 525/98 |
| 7,052,629 B2 | | 5/2006 | Maeda et al. | |
| 2003/0113626 A1 | | 6/2003 | Maeda et al. | |
| 2006/0058462 A1 | * | 3/2006 | Kim ....................... | H01M 4/621 525/166 |
| 2012/0189898 A1 | | 7/2012 | Wakizaka et al. | |
| 2012/0264878 A1 | | 10/2012 | Matsuyama et al. | |
| 2014/0151609 A1 | * | 6/2014 | Oguro .................. | H01M 4/1391 252/506 |
| 2015/0050555 A1 | * | 2/2015 | Fukumine ............. | H01M 4/622 429/217 |
| 2015/0099843 A1 | | 4/2015 | Hartig et al. | |

FOREIGN PATENT DOCUMENTS

| | | | |
|---|---|---|---|
| JP | H 11149929 | * | 6/1999 |
| JP | H11149929 A | | 6/1999 |
| JP | 2006513554 A | | 4/2006 |
| JP | 4473967 B2 | | 6/2010 |
| JP | 2012014920 A | | 1/2012 |
| JP | 2014209469 A | | 11/2014 |
| WO | 2013174894 A1 | | 11/2013 |

OTHER PUBLICATIONS

JP 2014-209469 MT (Year: 2014).*
JPH 11149929 (Year: 1999).*
Decision to Grant a Patent for Application No. 2016560123, issued by JPO dated Jan. 7, 2020. (Year: 2020).*
,Decision_to_grant_a_European_patent,dated Mar. 12, 2020 (Year: 2020).*
Decision_to_Grant_a_Patent_(Translated),dated Jan. 7, 2020 (Year: 2019).*
Jan. 26, 2016, International Search Report issued in the International Patent Application No. PCT/JP2015/079939.
May 23, 2017, International Preliminary Report on Patentability issued in the International Patent Application No. PCT/JP2015/079939.
May 30, 2018, Extended European Search Report issued by the European Patent Office in the corresponding European Patent Application No. 15860519.6.

* cited by examiner

*Primary Examiner* — Alexander Usyatinsky

(74) *Attorney, Agent, or Firm* — Kenja IP Law PC

(57) ABSTRACT

The present invention relates to a method for manufacturing a binder composition for a lithium-ion secondary battery electrode. The method comprises a step of dissolving a polymer having a melting point in a range of 50° C. to 150° C. in a monomer and obtaining a monomer solution in which the polymer is dissolved in the monomer; and a step of obtaining a composite polymer particle by subjecting the monomer solution to suspension polymerization or emulsion polymerization in an aqueous medium. The binder composition contains the composite polymer particle.

4 Claims, No Drawings

METHOD FOR MANUFACTURING A BINDER COMPOSITION FOR LITHIUM-ION SECONDARY BATTERY ELECTRODE

CROSS-REFERENCE TO RELATED APPLICATIONS

This application is a continuation application of U.S. application Ser. No. 15/523,484 filed May 1, 2017, which is a National Stage Application of PCT/JP2015/079939 filed Oct. 23, 2015, which claims priority based on Japanese Patent Application No. 2014-233361 filed Nov. 18, 2014. The disclosures of the prior applications are hereby incorporated by reference herein in their entirety.

TECHNICAL FIELD

The present invention relates to a binder composition for a lithium-ion secondary battery electrode.

BACKGROUND ART

Demand for an electrochemical device such as a lithium-ion secondary battery has been rapidly increased by taking advantage of a small size, a light weight, a high energy density, and a characteristic capable of being charged and discharged repeatedly. The lithium-ion secondary battery is used in a portable terminal such as a cellular phone or a notebook personal computer because of a relatively large energy density. The lithium-ion secondary battery used as a power source of such a portable terminal is a small lithium-ion secondary battery. On the other hand, a large lithium-ion secondary battery is used for a power source of an electric automobile or the like. Applications of a lithium-ion secondary battery are expanding as described above.

However, higher performance such as a higher capacity, a higher potential, or a higher durability is required at the same time.

For higher performance of a lithium-ion secondary battery, improvement of an electrode, an electrolytic solution, and another battery component has been studied. Among these components, an electrode is usually manufactured by mixing an electrode active material with a liquid composition obtained by dispersing or dissolving a polymer serving as a binder in a solvent to obtain a slurry composition, applying the slurry composition onto a current collector, and drying the slurry composition. In an electrode manufactured by such a method, it has been tried to achieve higher performance of a secondary battery by improving a binder (for example, refer to Patent Literature

CITATION LIST

Patent Literature

Patent Literature 1: JP 2012-14920 A

SUMMARY OF INVENTION

Technical Problem

However, demand for performance of a lithium-ion secondary battery has become more and more sophisticated recently. Improvement of response at the time of abnormality has been particularly demanded in addition to an original battery characteristic such as a cycle characteristic or a discharge rate characteristic.

The present invention has been achieved in view of the above problems. An object thereof is to provide a binder composition for a lithium-ion secondary battery electrode capable of lowering charge/discharge performance in cases when a battery abnormally generates heat or is in an abnormally high-temperature environment.

Solution to Problem

The present inventors made intensive studies in order to solve the above problems. As a result, the present inventors have found that a lithium-ion secondary battery having an excellent characteristic against an abnormal temperature can be achieved by using a predetermined composite polymer particle as a binder, and have completed the present invention.

That is, the present invention provides:

(1) a binder composition for a lithium-ion secondary battery electrode, containing a composite polymer particle obtained by polymerizing a monomer solution containing a polymer in an aqueous medium;

(2) the binder composition for a lithium-ion secondary battery electrode described in (1), in which the polymer is manufactured by a solution polymerization method, the monomer solution is obtained by dissolving the polymer in a monomer, and the composite polymer particle is obtained by subjecting the monomer solution to suspension polymerization or emulsion polymerization in an aqueous medium;

(3) the binder composition for a lithium-ion secondary battery electrode described in (1) or (2), in which the polymer is manufactured by a solution polymerization method, the monomer solution is obtained by dissolving the polymer in an amount of 5 to 100 parts by weight with respect to 100 parts by weight of a monomer, and the composite polymer particle is obtained by subjecting the monomer solution to suspension polymerization or emulsion polymerization in an aqueous medium;

(4) the binder composition for a lithium-ion secondary battery electrode described in (2) or (3), in which the polymer manufactured by the solution polymerization method is an olefin polymer;

(5) the binder composition for a lithium-ion secondary battery electrode described in any one of (2) to (4), in which the polymer manufactured by the solution polymerization method is a block copolymer;

(6) the binder composition for a lithium-ion secondary battery electrode described in any one of (2) to (5), in which the polymer manufactured by the solution polymerization method has a melting point in a range of 50° C. to 150° C.; and (7) the binder composition for a lithium-ion secondary battery electrode described in any one of (1) to (6), in which the composite polymer particle has a core-shell structure in which a shell portion containing a polymer having a binding property is further formed on a surface of the composite polymer particle.

Advantageous Effects of Invention

The binder composition for a lithium-ion secondary battery electrode according to the present invention can lower charge/discharge performance in cases when a battery abnormally generates heat or is in an abnormally high-temperature environment.

DESCRIPTION OF EMBODIMENTS

Hereinafter, a binder composition for a lithium-ion secondary battery electrode according to the present invention will be described. The binder composition for a lithium-ion secondary battery electrode (hereinafter, also referred to as "binder composition") according to the present invention contains a composite polymer particle obtained by polymerizing a monomer solution containing a polymer in an aqueous medium.

(Composite Polymer Particle)

The composite polymer particle is obtained by polymerizing a monomer solution containing a polymer in an aqueous medium.

(Polymer)

As the polymer contained in the monomer solution, used for manufacturing the composite polymer particle, a temperature-sensitive polymer changing characteristics thereof in a specific temperature range is used. The temperature-sensitive polymer preferably has an inflection point in change of a volume or an inflection point of an elastic modulus due to a temperature in a range of 50° C. to 150° C. Specifically, a polymer having a melting point of 50° C. to 150° C. or a polymer having a large linear expansion coefficient or changing the linear expansion coefficient in a range of 50° C. to 150° C. is preferable. Particularly, a polymer polymerized by a solution polymerization method (hereinafter, also referred to as "solution polymerized polymer") is preferably used. Here, the solution polymerization method is a method for polymerizing a mixture of one or more kinds of monomers in an organic solvent.

In the present invention, the polymer having the above characteristics is preferably dissolved in a monomer. Therefore, the polymer is preferably a polymer which can be dissolved in a monomer which can be subjected to emulsion polymerization or suspension polymerization in water.

As such a polymer, an olefin polymer can be preferably used, and a polymer obtained by hydrogenating a carbon-carbon double bond in a main chain of a copolymer of an aromatic vinyl compound and a conjugated diene compound can be more preferably used. A hydrogenation ratio of a double bond in the main chain is 50% or more, preferably 80% or more, and more preferably 90% or more.

Examples of the aromatic vinyl compound include a styrene compound such as styrene, α-methylstyrene, β-methylstyrene, p-t-butylstyrene, or chlorostyrene. Also, the aromatic vinyl compound may be used singly or in combination of two or more kinds thereof at any ratio.

More specific examples of the polymer include a polymer obtained by copolymerizing another monomer with styrene as a main component. The ratio of the aromatic vinyl compound in the polymer is preferably 5% by weight or more, more preferably 10% by weight or more, and particularly preferably 20% by weight or more.

Examples of the conjugated diene compound include 1,3-butadiene, isoprene, 2,3-dimethyl-1,3-butadiene, 1,3-pentadiene, and piperylenee. Among these compounds, 1,3-butadiene, isoprene, and 2,3-dimethyl-1,3-butadiene are preferable, and 1,3-butadiene is particularly preferable. Further, the conjugated diene compound may be used singly or in combination of two or more kinds thereof at any ratio.

The ratio of the conjugated diene compound in the polymer is preferably 10% by weight or more, more preferably 20% by weight or more, particularly preferably 30% by weight or more, preferably 90% by weight or less, more preferably 80% by weight or less, and particularly preferably 60% by weight or less.

Further, a copolymer of an aromatic vinyl compound and a conjugated diene compound can be also used. The weight ratio between the aromatic vinyl compound and the conjugated diene compound (aromatic vinyl compound/conjugated diene compound) is preferably 42/58 or more, more preferably 49/51 or more, particularly preferably 55/45 or more, preferably 87/13 or less, more preferably 80/20 or less, and particularly preferably 70/30 or less.

As the polymer of the conjugated diene compound, either a random copolymer or a block copolymer can be used, but the block copolymer is preferable. A bonding mode of the block copolymer of the conjugated diene compound is appropriately selected, for example, from a diblock copolymer, a triblock copolymer, a tetrablock copolymer, and a pentablock copolymer according to an intended use.

Specific examples of such a block copolymer include a styrene-isobutylene-styrene block copolymer (SIBS), a styrene-ethylene-butylene-styrene block copolymer (SEBS), and a styrene-ethylene-propylene-styrene block copolymer (SEPS). Among these copolymers, a styrene-ethylene-butylene-styrene block copolymer (SEBS) is preferably used. Note that, a method for manufacturing a block copolymer is not particularly limited, but the block copolymer may be manufactured by a known method.

(Monomer)

A monomer used in the monomer solution in the present invention is not particularly limited, but can be selected appropriately according to the kind of the polymer. In the present invention, as a monomer, styrene, p-methyl styrene, a-methyl styrene, or the like can be preferably used, and styrene is more preferably used. These monomers may be used singly or in combination of two or more kinds thereof.

(Method for Manufacturing Composite Polymer Particle)

The composite polymer particle is obtained by polymerizing a monomer solution containing the above-mentioned polymer in an aqueous medium. The composite polymer particle is preferably obtained by polymerizing the monomer solution having a polymer dissolved in a monomer in an aqueous medium. The monomer in the monomer solution is polymerized by polymerization, and therefore the composite polymer particle is obtained while being dispersed in an aqueous medium.

A polymerization method is not limited as long as a desired composite polymer particle is obtained. However, polymerization is performed by an emulsion polymerization method or a suspension polymerization method.

The emulsion polymerization method is usually performed according to a conventional method. For example, the emulsion polymerization method is performed according to a method described in "Experimental Chemistry" Vol. 28, (Publisher: Maruzen Co., Ltd., edited by the Chemical Society of Japan). That is, this is a method for putting water, a dispersing agent, an emulsifier, an additive such as a crosslinking agent, a polymerization initiator, and a monomer solution in a sealed container equipped with a stirrer and a heating device so as to obtain a predetermined composition, emulsifying a monomer or the like in water by stirring the composition in the container, and initiating polymerization by raising the temperature under stirring. Alternatively, this is a method for putting the composition in a sealed container after the composition is emulsified, and initiating a reaction similarly.

In addition, the suspension polymerization method is a method for performing polymerization by suspending the composition in an aqueous medium in the presence of a dispersing agent dissolved in the aqueous medium.

Here, the aqueous medium is a medium containing water. Specific examples thereof include water, ketones, alcohols, glycols, glycol ethers, ethers, and a mixture thereof.

Further, the monomer solution used for the polymerization preferably contains a polymer in an amount of 5 to 100 parts by weight with respect to 100 parts by weight of a monomer.

As a surfactant used in an emulsion polymerization or suspension polymerization method, any surfactant can be used as long as a desired composite polymer particle is obtained. Examples thereof include sodium dodecylbenzene sulfonate, sodium lauryl sulfate, sodium dodecyl diphenyl ether disulfonate, and dialkyl succinate sodium sulfonate. For example, a reactive emulsifier having an unsaturated bond may be used. Among these compounds, sodium dodecyl diphenyl ether disulfonate is preferable from viewpoints of excellent versatility in manufacturing and the small amount of bubbles generated. The surfactant may be used singly or in combination of two or more kinds thereof at any ratio.

Any amount of the surfactant can be used as long as a desired composite polymer particle is obtained. The amount is preferably 0.5 parts by weight or more, more preferably 1 part by weight or more, preferably 10 parts by weight or less, and more preferably 5 parts by weight or less with respect to 100 parts by weight of the monomer solution.

Further, in a polymerization reaction, a polymerization initiator is usually used. As the polymerization initiator, any polymerization initiator can be used as long as a desired composite polymer particle is obtained. Examples thereof include sodium persulfate (NaPS), ammonium persulfate (APS), and potassium persulfate (KPS). Among these compounds, sodium persulfate and ammonium persulfate are preferable, and ammonium persulfate is more preferable. By using ammonium persulfate or sodium persulfate as a polymerization initiator, it is possible to suppress a decrease in a cycle characteristic of a lithium-ion secondary battery obtained.

Further, in polymerization, a polymerization system may include a molecular weight regulator or a chain transfer agent. Examples of the molecular weight regulator or the chain transfer agent include an alkyl mercaptan such as n-hexyl mercaptan, n-octyl mercaptan, t-octyl mercaptan, n-dodecyl mercaptan, t-dodecyl mercaptan, or n-stearyl mercaptan; a xanthogen compound such as dimethylxanthogen disulfide or diisopropylxanthogen disulfide; terpinolene; a thiuram compound such as tetramethyl thiuram disulfide, tetraethyl thiuram disulfide, or tetramethylthiuram monosulfide; a phenol compound such as 2,6-di-t-butyl-4-methyl phenol or styrenated phenol; an allyl compound such as allyl alcohol; a halogenated hydrocarbon compound such as dichloromethane, dibromomethane, or carbon tetrabromide; thioglycolic acid, thiomalic acid, 2-ethylhexyl thioglycolate, diphenylethylene, and a-methyl styrene dimer. Among these compounds, an alkyl mercaptan is preferable, and t-dodecyl mercaptan is more preferable from a viewpoint of suppressing a side reaction. These compounds may be used singly or in combination of two or more kinds thereof at any ratio.

(Physical Properties of Composite Polymer Particle)

The number average particle diameter of the composite polymer particle is preferably 50 nm or more, more preferably 70 nm or more, preferably 500 nm or less, and more preferably 400 nm or less from a viewpoint of excellent strength and flexibility of an electrode.

(Composite Polymer Particle Having Core-Shell Structure)

When a composite polymer particle itself obtained by polymerizing a monomer solution containing a polymer in an aqueous medium does not have a binding property with an electrode active material or has an insufficient binding property, a shell portion containing a polymer having a binding property may be formed on a surface of the composite polymer particle in order to impart a binding property.

That is, in this case, a composite polymer particle having a core-shell structure, containing a composite polymer particle obtained by polymerizing a monomer solution containing a polymer (preferably, a solution polymerization polymer) in an aqueous medium as a core portion and containing a polymer having a binding property as a shell portion is obtained.

Here, as the core-shell structure, the shell portion may completely cover the core portion so as to wrap the core portion, or may partially cover the core portion.

Examples of a polymer which can be used for the shell portion include an acrylic polymer and a conjugated diene polymer.

(Acrylic Polymer)

The acrylic polymer is a polymer including a monomer unit, obtained by polymerizing a (meth)acrylate compound. Examples of the polymer include a homopolymer of a (meth)acrylate compound and a copolymer of the (meth)acrylate compound and a monomer copolymerizable therewith. By using a polymer of the (meth)acrylate compound, a binding property of the composite polymer particle can be enhanced. Note that, the term "(meth)acrylic" means acrylic or methacrylic in the present invention.

Examples of the (meth)acrylate compound include an alkyl acrylate such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, nonyl acrylate, decyl acrylate, lauryl acrylate, n-tetradecyl acrylate, stearyl acrylate, 2-ethylhexyl acrylate, 2-methoxyethyl acrylate, or 2-ethoxyethyl acrylate; a 2-(perfluoroalkyl) ethyl acrylate such as 2-(perfluorobutyl) ethyl acrylate, or 2-(perfluoropentyl) ethyl acrylate; an alkyl methacrylate such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, nonyl methacrylate, decyl methacrylate, lauryl methacrylate, tridecyl methacrylate, n-tetradecyl methacrylate, stearyl methacrylate, or 2-ethylhexyl methacrylate; a 2-(perfluoroalkyl) ethyl methacrylate such as 2-(perfluorobutyl) ethyl methacrylate, 2-(perfluoropentyl) ethyl methacrylate, or 2-(perfluoroalkyl) ethyl methacrylate; benzyl acrylate; and benzyl methacrylate. Among these compounds, at least one selected from the group consisting of methyl acrylate, ethyl acrylate, n-propyl acrylate, isopropyl acrylate, n-butyl acrylate, t-butyl acrylate, methyl methacrylate, ethyl methacrylate, n-propyl methacrylate, isopropyl methacrylate, n-butyl methacrylate, and t-butyl methacrylate is preferably contained, and at least one selected from the group consisting of methyl acrylate, ethyl acrylate, n-butyl acrylate, t-butyl acrylate, methyl methacrylate, ethyl methacrylate, n-butyl methacrylate, and t-butyl methacrylate is particularly preferably contained from a viewpoint of an excellent yield of the composite polymer particle and excellent physical properties of a lithium-ion secondary battery. Further, the (meth)acrylate compound may be used singly or in combination of two or more kinds thereof at any ratio.

The ratio of the (meth)acrylate compound contained in the polymer constituting the shell portion is preferably 40% by weight or more, more preferably 50% by weight or more, particularly preferably 60% by weight or more, preferably 95% by weight or less, more preferably 90% by weight or less, and particularly preferably 85% by weight or less. By setting the ratio of the (meth)acrylate compound to the lower limit value or more in the above range, a binding property between the composite polymer particle and an active material or a current collector can be further improved. By setting the ratio of the (meth)acrylate compound to the upper limit value or less, a binder composition having excellent stability can be obtained.

(Monomer Copolymerizable with (Meth)Acrylate Compound)

Examples of a monomer copolymerizable with a (meth)acrylate compound include a polyfunctional vinyl compound and a monomer having a hydrophilic group.

(Polyfunctional Vinyl Compound)

The polyfunctional vinyl compound means a compound having two or more vinyl groups per molecule. By copolymerizing a polyfunctional vinyl compound with the above-mentioned (meth)acrylate compound, a crosslinked structure or a branched structure is formed. A composite polymer particle obtained has excellent toughness and strength due to such a crosslinked structure or branched structure. A bonding property of the composite polymer particle can be thereby enhanced.

Examples of the polyfunctional vinyl compound include a bifunctional vinyl compound having two vinyl groups per molecule, such as divinyl benzene, diethylene glycol di(meth)acrylate, polyethylene glycol di(meth)acrylate, polypropylene glycol di(meth)acrylate, neopentyl glycol di(meth)acrylate, 1,6-hexanediol di(meth)acrylates, or diallyl phthalate; a trifunctional vinyl compound having three vinyl groups per molecule, such as trimethylolpropane tri(meth)acrylate, pentaerythritol tri(meth)acrylate, aliphatic tri(meth)acrylate, or trivinyl cyclohexane; a tetrafunctional vinyl compound having four vinyl groups per molecule, such as pentaerythritol tetra(meth)acrylate, ditrimethylolpropane tetra(meth)acrylate, or aliphatic tetra(meth)acrylate; a pentafunctional vinyl compound having five vinyl groups per molecule, such as dipentaerythritol penta(meth)acrylate or dipentaerythritol hexa(meth)acrylate; and a (meth)acrylate having a polyester skeleton, a urethane skeleton, or a phosphazene skeleton, and having two or more vinyl groups per molecule. Further, the polyfunctional vinyl compound may be used singly or in combination of two or more kinds thereof at any ratio.

The ratio of the polyfunctional vinyl compound in the (meth)acrylate compound is preferably 0.001 parts by weight or more, more preferably 0.01 parts by weight or more, particularly preferably 0.05 parts by weight or more, preferably 7 parts by weight or less, more preferably 5 parts by weight or less, and particularly preferably 3 parts by weight or less with respect to 100 parts by weight of a monomer. By setting the ratio of the polyfunctional vinyl compound to the lower limit value or more in the above range, a binding property between an electrode active material layer and a current collector can be enhanced.

(Monomer Having Hydrophilic Group)

Examples of the monomer having a hydrophilic group include a monomer having a carboxy group (—COOH group), a hydroxy group (—OH group), a sulfonic acid group (—SO$_3$H group), a —PO$_3$H$_2$ group, a —PO(OH)(OR) group (R represents a hydrocarbon group), or a lower polyoxyalkylene group as a hydrophilic group.

Examples of the monomer having a carboxy group as a hydrophilic group include a monocarboxylic acid and a derivative thereof; a dicarboxylic acid and a derivative thereof; and acid anhydrides thereof and derivatives thereof. Examples of the monocarboxylic acid include acrylic acid, methacrylic acid, and crotonic acid. Examples of a derivative of the monocarboxylic acid include 2-ethyl acrylic acid, isocrotonic acid, α-acetoxy acrylic acid, β-trans-aryloxy acrylic acid, α-chloro-β-E-methoxy acrylic acid, and β-diamino acrylic acid. Examples of the dicarboxylic acid include maleic acid, fumaric acid, and itaconic acid. Examples of an anhydride of the dicarboxylic acid include maleic anhydride, acrylic anhydride, methyl maleic anhydride, and dimethyl maleic anhydride. Examples of a derivative of the dicarboxylic acid include a halogenated maleic acid such as chloro maleic acid, dichloro maleic acid, or fluoro maleic acid; and a maleate such as methyl maleate, dimethyl maleate, phenyl maleate, methylallyl maleate, diphenyl maleate, nonyl maleate, decyl maleate, dodecyl maleate, octadecyl maleate, or fluoroalkyl maleate.

Examples of the monomer having a hydroxy group as a hydrophilic group include an ethylenically unsaturated alcohol such as (meth)allyl alcohol, 3-buten-1-ol, or 5-hexen-1-ol; alkanol esters of an ethylenically unsaturated carboxylic acid such as 2-hydroxy ethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, or di-2-hydroxypropyl itaconate; esters of polyalkylene glycol and (meth)acrylic acid represented by formula $CH_2=CR^1—COO—(C_nH_{2n}O)_m—H$ (m represents an integer of 2 to 9, n represents an integer of 2 to 4, and $R^1$ represents a hydrogen atom or a methyl group); mono(meth)acrylates of a dihydroxy ester of a dicarboxylic acid, such as 2-hydroxyethyl-2'-(meth)acryloyloxy phthalate or 2-hydroxyethyl-2'-(meth)acryloyloxy succinate; vinyl ethers such as 2-hydroxyethyl vinyl ether or 2-hydroxypropyl vinyl ether; mono(meth)allyl ethers of alkylene glycol, such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, or (meth)allyl-6-hydroxyhexyl ether; polyoxyalkylene glycol (meth)monoallyl ethers such as diethylene glycol mono(meth)allyl ether or dipropylene glycol mono(meth)allyl ether; a mono(meth)allyl ether of a halogen and hydroxy-substituted (poly)alkylene glycol, such as glycerol mono(meth)allyl ether, (meth)allyl-2-chloro-3-hydroxypropyl ether, or (meth)allyl-2-hydroxy-3-chloropropyl ether; a mono (meth)allyl ether of a polyhydric phenol, such as eugenol or iso-eugenol, and a halogen-substituted product thereof; and (meth)allyl thioethers of alkylene glycol, such as (meth)allyl-2-hydroxyethyl thioether or (meth)allyl-2-hydroxy propyl thioether.

Examples of the monomer having a sulfonic acid group as a hydrophilic group include vinyl sulfonic acid, methyl vinyl sulfonic acid, (meth)allyl sulfonic acid, styrene sulfonic acid, (meth)acrylic acid-2-ethyl sulfonate, 2-acrylamido-2-methylpropane sulfonic acid, and 3-allyloxy-2-hydroxypropane sulfonic acid.

Examples of the monomer having a —PO$_3$H$_2$ group or a —PO(OH) (OR) group (R represents a hydrocarbon group) as a hydrophilic group include phosphoric acid-2-(meth)acryloyloxy ethyl, methyl phosphate-2-(meth)acryloyloxyethyl, and ethyl phosphate-(meth)acryloyloxyethyl.

Examples of the monomer having a lower polyoxyalkylene group as a hydrophilic group include a poly(alkylene oxide) such as poly(ethylene oxide).

The ratio of the monomer having a hydrophilic group in the shell portion is preferably 2% by weight or more, more preferably 3% by weight or more, particularly preferably 5% by weight or more, preferably 20% by weight or less, more preferably 15% by weight or less, and particularly preferably 10% by weight or less. By setting the ratio of the monomer having a hydrophilic group to the lower limit value or more in the above range, a binding property between the composite polymer particle and an active material or a current collector can be further improved. In addition, a binder composition having an excellent lithium ion conductivity can be obtained. By setting the ratio of the monomer having a hydrophilic group to the upper limit value or less, a particle stability of the composite polymer particle during polymerization can be excellent.

(Other Monomers)

Examples of the monomer copolymerizable with a (meth) acrylate compound further include, in addition to the above polyfunctional vinyl compound and the monomer having a hydrophilic group, a styrene monomer such as styrene, vinyl toluene, t-butyl styrene, vinyl benzoate, methyl vinyl benzoate, vinyl naphthalene, hydroxymethyl styrene, α-methyl styrene, or divinylbenzene; an amide monomer such as acrylamide or methacrylamide; an α,β-unsaturated nitrile compound such as acrylonitrile or methacrylonitrile, olefins such as ethylene or propylene; a diene monomer such as butadiene or isoprene; a halogen atom-containing monomer such as vinyl chloride or vinylidene chloride; vinyl esters such as vinyl acetate, vinyl propionate, vinyl butyrate, or vinyl benzoate; vinyl ethers such as methyl vinyl ether, ethyl vinyl ether, or butyl vinyl ether; vinyl ketones such as methyl vinyl ketone, ethyl vinyl ketone, butyl vinyl ketone, hexyl vinyl ketone, or isopropenyl vinyl ketone; and a heterocyclic ring-containing vinyl compound such as N-vinyl pyrrolidone, vinyl pyridine, or vinyl imidazole. Further, these compounds may be used singly or in combination of two or more kinds thereof at any ratio.

(Manufacturing Composite Polymer Particle Having Core-Shell Structure)

When a composite polymer particle having a core-shell structure in which a shell portion containing a polymer having a binding property is formed on a surface of the composite polymer particle is used as the composite polymer particle, the composite polymer particle is obtained by polymerizing a mixture of two or more kinds of monomers in stages. A method for manufacturing such a composite polymer particle is disclosed at pages 38 to 45 of Polymer Latex (New Polymer Bunko 26) (Polymer Publishing Society, first edition), JP 4473967 B2, or the like.

Specifically, the composite polymer particle having a core-shell structure is manufactured in the following manner: a monomer that provides a first stage polymer is polymerized to obtain a composite polymer particle (seed particle) as a core portion, and a monomer that provides a polymer having a binding property as the second stage is polymerized in the presence of the composite polymer particle (seed particle) as a core portion. In this case, a core-shell structure may be formed by polymerizing a composite polymer particle (seed particle) as a core portion, then adding and porimerizing a monomer that provides a polymer having a binding property for a shell portion thereto in the same reactor, or a core-shell structure may be formed by polymerizing a monomer for forming a shell portion in a reactor using a seed particle as a core portion which has been formed in another reactor.

Note that, the composite polymer particle used as a seed particle can be obtained by polymerizing a monomer solution containing a polymer (preferably, a solution polymerization polymer) in an aqueous medium, and the composite polymer particle used as a seed particle can be manufactured as described in the section of (Method for manufacturing composite polymer particle).

(Binder Composition)

The binder composition of the present invention contains a solvent in addition to the composite polymer particle described above. Usually, in the binder composition, the composite polymer particle is dispersed in a solvent, and the binder composition is a fluid-like composition. As the solvent used in the binder composition, usually, a solvent similar to the aqueous medium used in manufacturing the composite polymer particle can be used. Among the solvents, water is preferably used. Further, the solvents may be used singly or in combination of two or more kinds thereof at any ratio.

The amount of a solvent in the binder composition is such an amount that a concentration of a solid content in the binder composition is usually 15% by weight or more, preferably 20% by weight or more, more preferably 30% by weight or more, usually 70% by weight or less, preferably 65% by weight or less, and more preferably 60% by weight or less from a viewpoint of excellent workability in manufacturing a slurry composition for forming an electrode active material layer. Here, the solid content in the binder composition means a component which is not evaporated but remains when the binder composition is dried and a liquid is removed.

(Lithium-Ion Secondary Battery)

The binder composition of the present invention can be used for a lithium-ion secondary battery electrode. The lithium-ion secondary battery electrode is obtained by forming an electrode active material layer on a current collector. The electrode active material layer contains an electrode active material, the binder composition of the present invention, and a thickening agent, a conductive material, and the like optionally used. Further, the content of the binder composition in the electrode active material layer is from 0.1 to 20 parts by weight, preferably from 0.2 to 15 parts by weight, and more preferably from 0.3 to 10 parts by weight with respect to 100 parts by weight of the electrode active material layer.

The electrode active material layer is formed by applying a slurry composition containing an electrode active material, the binder composition of the present invention, and a thickening agent, a conductive material, and the like optionally used onto a current collector, and drying the slurry composition.

A method for applying a slurry composition onto a current collector is not particularly limited. Examples of the method include a doctor blade method, a dip method, a reverse roll method, a direct roll method, a gravure method, an extrusion method, comma direct coating, slide die coating, and a brush coating method. Examples of a drying method include drying with warm air, hot air, or low humidity air, vacuum drying, and a drying method by irradiation with a (far) infrared ray, an electron beam, or the like. Drying time is usually from 1 to 60 minutes. A drying temperature is usually from 40 to 180° C. An electrode active material layer may be formed by repeating applying and drying a slurry composition a plurality of times.

Here, the slurry composition can be obtained by mixing an electrode active material, a binder, a thickening agent and a conductive material optionally used, a solvent such as water, and the like.

A mixing method in preparing a slurry composition is not particularly limited. However, examples thereof include a method using a mixing apparatus such as a stirring type, a shaking type, or a rotary type. Examples thereof further include a method using a dispersion kneading apparatus such as a homogenizer, a ball mill, a sand mill, a roll mill, a planetary mixer, or a planetary kneader.

(Current Collector)

Examples of a material of the current collector include metal, carbon, and a conductive polymer. Metal is preferably used. Examples of the metal for the current collector include aluminum, platinum, nickel, tantalum, titanium, stainless steel, copper, and an alloy. Among these metals, copper, aluminum, or an aluminum alloy is preferably used in view of conductivity and voltage resistance.

The thickness of the current collector is preferably from 5 to 100 μm, more preferably from 8 to 70 μm, and still more preferably from 10 to 50 μm.

(Electrode Active Material)

When a lithium-ion secondary battery electrode is a positive electrode, examples of an electrode active material (positive electrode active material) include a metal oxide which can be doped or de-doped with a lithium ion reversibly. Examples of such a metal oxide include lithium cobaltate, lithium nickelate, lithium manganate, and lithium iron phosphate. Note that, the positive electrode active material exemplified in the above may be appropriately used singly or in combination of a plurality of kinds thereof according to an intended use.

Examples of an active material of a negative electrode (negative electrode active material) as a counter electrode of a positive electrode in a lithium-ion secondary battery include easily graphitizable carbon, hardly graphitizable carbon, low-crystalline carbon (amorphous carbon) such as pyrolytic carbon, graphite (natural graphite, artificial graphite), an alloy material formed of tin or silicon, and an oxide such as silicon oxide, tin oxide, or lithium titanate. Note that, the negative electrode active material exemplified in the above may be appropriately used singly or in combination of a plurality of kinds thereof according to an intended use.

The shape of the electrode active material in a lithium-ion secondary battery electrode is preferably adjusted into a granular shape. When the shape of a particle is granular, an electrode having a higher density can be formed in forming the electrode.

The volume average particle diameter of the electrode active material in a lithium-ion secondary battery electrode is usually from 0.1 to 100 μm, preferably from 0.5 to 50 μm, and more preferably from 0.8 to 30 μm in each of a positive electrode and a negative electrode.

(Conductive Material)

The electrode active material layer may contain a conductive material, as necessary. The conductive material is not particularly limited as long as having conductivity, but a particulate material having conductivity is preferable. Examples thereof include conductive carbon black such as furnace black, acetylene black, or Ketjen black; graphite such as natural graphite or artificial graphite; and a carbon fiber such as a polyacrylonitrile carbon fiber, a pitch carbon fiber, or a vapor grown carbon fiber. When the conductive material is a particulate material, the average particle diameter thereof is not particularly limited, but is preferably smaller than that of the electrode active material, and is preferably from 0.001 to 10 μm, more preferably from 0.05 to 5 μm, and still more preferably from 0.1 to 1 μm from a viewpoint of exhibiting a sufficient conductivity with a smaller use amount.

(Thickening Agent)

The electrode active material layer may contain a thickening agent, as necessary. Examples of the thickening agent include a cellulose polymer such as carboxymethylcellulose, methylcellulose, or hydroxypropylcellulose, and an ammonium salt or an alkali metal salt thereof; (modified) poly (meth)acrylic acid and an ammonium salt or an alkali metal salt thereof; polyvinyl alcohols such as (modified) polyvinyl alcohol, a copolymer of acrylic acid or acrylate and vinyl alcohol, or a copolymer of maleic anhydride, maleic acid, or fumaric acid and vinyl alcohol; polyethylene glycol, polyethyleneoxide, polyvinyl pyrrolidone, modified polyacrylic acid, oxidized starch, starch phosphate, casein, various modified starch, and an acrylonitrile-butadiene copolymer hydrogenated product. Among these compounds, carboxymethylcellulose, an ammonium salt thereof, and an alkali metal salt thereof are preferably used. Note that, in the present invention, "(modified) poly" means "non-modified poly" or "modified poly".

The content of the thickening agent in the electrode active material layer is preferably within a range not having an influence on a battery characteristic, and is preferably from 0.1 to 5 parts by weight, more preferably from 0.2 to 4 parts by weight, and still more preferably from 0.3 to 3 parts by weight with respect to 100 parts by weight of the electrode active material layer.

(Lithium-Ion Secondary Battery)

A lithium-ion secondary battery can be manufactured using a lithium-ion secondary battery electrode containing the binder composition of the present invention. For example, the lithium-ion secondary battery uses a lithium-ion secondary battery electrode in which an electrode active material layer containing the binder composition of the present invention is formed as at least one of a positive electrode and a negative electrode, and further contains a separator and an electrolytic solution.

Examples of the separator include a microporous film or a nonwoven fabric containing a polyolefin resin such as polyethylene or polypropylene, or an aromatic polyamide resin; and a porous resin coating containing inorganic ceramic powder.

The thickness of the separator is preferably from 0.5 to 40 μm, more preferably from 1 to 30 μm, and still more preferably from 1 to 25 μm from a viewpoint of reducing a resistance due to the separator in a lithium-ion secondary battery and excellent workability in manufacturing the lithium-ion secondary battery.

(Electrolytic Solution)

The electrolytic solution is not particularly limited, but examples thereof include a solution obtained by dissolving a lithium salt as a supporting electrolyte in a non-aqueous solvent. Examples of the lithium salt include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. $LiPF_6$, $LiClO_4$, and $CF_3SO_3Li$ which are easily dissolved in a solvent and exhibit a high dissociation degree are preferably used. These compounds can be used singly or in mixture of two or more kinds thereof. The amount of the supporting electrolyte is usually 1% by weight or more, preferably 5% by weight or more, usually 30% by weight or less, and preferably 20% by weight or less with respect to the electrolytic solution. When the amount of the supporting electrolyte is either too large or too small, an ion conductivity decreases, and leading to deterioration of charging characteristic and discharge characteristic of a battery.

A solvent used for the electrolytic solution is not particularly limited as long as dissolving a supporting electrolyte, but examples thereof usually include alkyl carbonates such as dimethyl carbonate (DMC), ethylene carbonate (EC), diethyl carbonate (DEC), propylene carbonate (PC), butylene carbonate (BC), or methylethyl carbonate (MEC); esters such as γ-butyrolactone or methyl formate; ethers such as 1,2-dimethoxy ethane or tetrahydrofuran; and sulfur-containing compounds such as sulfolane or dimethyl sulfoxide. Dimethyl carbonate, ethylene carbonate, propylene carbonate, diethyl carbonate, and methylethyl carbonate are preferable because a particularly high ion conductivity is easily obtained and a temperature range to be used is wide. These compounds can be used singly or in mixture of two or more kinds thereof. Further, the electrolytic solution can contain an additive. In addition, a carbonate compound such as vinylene carbonate (VC) is preferable as the additive.

Examples of an electrolytic solution other than the above compounds include a gel-like polymer electrolyte in which a polymer electrolyte such as polyethylene oxide or polyacrylonitrile is impregnated with an electrolytic solution, and an inorganic solid electrolyte such as lithium sulfide, LiI, $Li_3N$, or $Li_2S$—$P_2S_5$ glass ceramic.

A lithium-ion secondary battery is obtained by overlaying a negative electrode and a positive electrode with a separator interposed therebetween, winding or folding the resulting product according to a battery shape, putting the resulting product in a battery container, injecting an electrolytic solution into the battery container, and sealing an opening of the battery container. An overcurrent prevention device such as an expand metal, a fuse, or a PTC device, a lead plate, or the like is further put therein as necessary to prevent an increase in pressure in the battery, overcharge and overdischarge. The shape of the battery may be a laminate cell type, a coin type, a button type, a sheet type, a cylinder type, a square type, a flat type, or the like.

A lithium-ion secondary battery using the binder composition of the present invention can lower charge/discharge performance in cases when the battery abnormally generates heat or is in an abnormally high-temperature environment.

EXAMPLES

Hereinafter, the present invention will be described specifically by showing Examples. However, the present invention is not limited to the following Examples, but can be performed by modification in a range not departing from the abstract of the present invention and a scope equal thereto. Note that, "%" and "part" indicating the amount in the following description are based on the weight unless otherwise specified. In addition, operations described below were performed at a normal temperature and a normal pressure unless otherwise specified.

In Examples and Comparative Examples, evaluation for a binding property and temperature dependency of a resistance value was performed as follows.

(Binding Property)

An electrode manufactured in each of Examples and Comparative Examples was cut out into a rectangular shape having a length of 100 mm and a width of 10 mm to be used as a test piece. A cellophane tape was pasted on a surface of an electrode active material layer with the surface of the electrode active material layer facing downward. In this case, a cellophane tape defined in JIS 21522 was used. In addition, the cellophane tape was fixed to a horizontal test stand with an adhesive surface facing upward. Thereafter, one end of a current collector was pulled vertically upward at a pulling rate of 50 mm/min and the cellophane tape was peeled off. A stress at this time was measured. This measurement was performed three times, and an average value of stresses measured was determined to be used as a peel strength.

The peel strength determined was judged based on the following criteria. A larger peel strength indicates a larger binding force of the electrode active material layer on the current collector, that is, indicates an excellent binding property.

A: 4 N/m or more
B: 3 N/m or more and less than 4 N/m
C: 2 N/m or more and less than 3 N/m
D: less than 2 N/m (Temperature Dependency of Resistance Value)

An electrode manufactured in each of Examples and Comparative Examples was cut out into a test piece having a size of 50 mm×40 mm. This test piece was sandwiched by SUS plates having a thickness of 0.2 mm, was put in a thermostatic bath while a load of 200 g was applied to the test piece, and was held at a predetermined temperature (50° C., 60° C., 70° C., 80° C., 90° C., or 100° C.) for ten minutes. Thereafter, a resistance value was measured. Table 1 indicates resistance values at temperatures when a measured value at 80° C. is assumed to be 100. A test piece increasing a resistance value at 90° C. or higher has an excellent characteristic against an abnormal temperature.

Example 1

(Manufacturing Binder Composition)

100 parts of a monomer solution obtained by dissolving 20 parts of SEBS (manufactured by Asahi Kasei Chemicals Corporation, Tuftec "H1041" (having an inflection point of an elastic modulus around 80° C.)) in 80 parts of styrene beforehand, 4 parts of sodium lauryl sulfate as an emulsifier, 150 parts of ion-exchanged water as a solvent, and 0.5 parts of ammonium persulfate as a polymerization initiator were put in a 5 MPa pressure-resistant container equipped with a stirrer. The resulting mixture was sufficiently stirred. Thereafter, the temperature thereof was raised to 80° C., and polymerization at the first stage was started.

When the polymerization conversion rate reached 96%, 50 parts of n-butyl acrylate (hereinafter, also referred to as "BA") and 1 part of a polymerization initiator were prop-added, and polymerization at the second stage was performed. When the total polymerization conversion rate reached 98%, the mixture was cooled, and the reaction was stopped to obtain a mixture containing a composite polymer particle. A 5% aqueous sodium hydroxide solution was added to this mixture, and the pH thereof was adjusted to 7 to obtain a binder composition containing a desired composite polymer particle.

(Manufacturing Slurry Composition)

99 parts of natural graphite as a negative electrode active material formed of carbon, 1 part of the binder composition in terms of a solid content, and 1 part of a high molecular weight type carboxymethyl cellulose (1% aqueous solution of "MAC800LC" manufactured by NIPPON PAPER Chemicals Co., Ltd., viscosity measured with a B-type viscometer at 25° C.: 7800 mPa·s) in terms of a solid content as a thickening agent were put in a planetary mixer. Ion-exchanged water was further added thereto such that the total concentration of the solid content was 52%, and was mixed therewith to prepare a slurry composition.

(Manufacturing Electrode)

The slurry composition was applied onto a copper foil having a thickness of 20 μm as a current collector with a comma coater. At this time, the slurry composition was applied such that the solid content of the slurry composition per unit area of a surface of the copper foil was 11 mg/cm² to 12 mg/cm². Thereafter, the slurry composition applied was dried to form an electrode active material layer on a surface of the copper foil. Drying was performed by conveying the copper foil in an oven at 60° C. at a rate of 0.5 m/min over two minutes.

Thereafter, the copper foil was subjected to a heat treatment at 120° C. for two minutes to obtain a negative electrode raw material. This raw material was pressed with a roll press machine such that the density of a negative electrode active material layer in a negative electrode was 1.50 g/cm$^3$ to 1.60 g/cm$^3$ to obtain a negative electrode. A part of this negative electrode was cut out, and a resistance value and a binding property of the negative electrode were measured.

Example 2

(Manufacturing Binder Composition)
105 parts of a monomer solution obtained by dissolving 25 parts of SEBS (manufactured by Kraton Corporation, Kraton G1657MS (having a large linear expansion coefficient in a range of 50° C. to 150° C.)) in 80 parts of styrene beforehand, 4 parts of sodium lauryl sulfate as an emulsifier, 150 parts of ion-exchanged water as a solvent, and 0.5 parts of ammonium persulfate as a polymerization initiator were put in a 5 MPa pressure-resistant container equipped with a stirrer. The resulting mixture was sufficiently stirred. Thereafter, the temperature thereof was raised to 80° C., and polymerization at the first stage was started.

When the polymerization conversion rate reached 96%, 30 parts of n-butyl acrylate, 5 parts of methyl acrylate (hereinafter, also referred to as "MA"), and 1 part of a polymerization initiator were prop-added, and polymerization at the second stage was performed. When the total polymerization conversion rate reached 98%, the mixture was cooled, and the reaction was stopped to obtain a mixture containing a composite polymer particle. A 5% aqueous sodium hydroxide solution was added to this mixture, and the pH thereof was adjusted to 7 to obtain a binder composition containing a desired composite polymer particle.

A slurry composition and an electrode were manufactured in a similar manner to Example 1 except that the binder composition obtained in this way was used.

Example 3

(Manufacturing Binder Composition)
100 parts of a monomer solution obtained by dissolving 30 parts of SEBS (manufactured by Asahi Kasei Chemicals Corporation, Tuftec "H1041") in 70 parts of styrene beforehand, 4 parts of sodium lauryl sulfate as an emulsifier, 150 parts of ion-exchanged water as a solvent, and 0.5 parts of ammonium persulfate as a polymerization initiator were put in a 5 MPa pressure-resistant container equipped with a stirrer. The resulting mixture was sufficiently stirred. Thereafter, the temperature thereof was raised to 80° C., and polymerization at the first stage was started.

When the polymerization conversion rate reached 96%, 100 parts of n-butyl acrylate, 2 parts of methyl acrylate, and 1 part of a polymerization initiator were prop-added, and polymerization at the second stage was performed. When the total polymerization conversion rate reached 98%, the mixture was cooled, and the reaction was stopped to obtain a mixture containing a composite polymer particle. A 5% aqueous sodium hydroxide solution was added to this mixture, and the pH thereof was adjusted to 7 to obtain a binder composition containing a desired composite polymer particle.

A slurry composition and an electrode were manufactured in a similar manner to Example 1 except that the binder composition obtained in this way was used.

Comparative Example 1

(Manufacturing Binder Composition)
100 parts of styrene, 4 parts of sodium lauryl sulfate as an emulsifier, 150 parts of ion-exchanged water as a solvent, and 0.5 parts of ammonium persulfate as a polymerization initiator were put in a 5 MPa pressure-resistant container equipped with a stirrer. The resulting mixture was sufficiently stirred. Thereafter, the temperature thereof was raised to 80° C., and polymerization at the first stage was started.

When the polymerization conversion rate reached 96%, 50 parts of n-butyl acrylate and 1 part of a polymerization initiator were prop-added, and polymerization at the second stage was performed. When the total polymerization conversion rate reached 98%, the mixture was cooled, and the reaction was stopped to obtain a mixture containing a composite polymer particle. A 5% aqueous sodium hydroxide solution was added to this mixture, and the pH thereof was adjusted to 7 to obtain a binder composition containing a desired composite polymer particle.

A slurry composition and an electrode were manufactured in a similar manner to Example 1 except that the binder composition obtained in this way was used.

Comparative Example 2

(Manufacturing Binder Composition)
50 parts of styrene, 4 parts of sodium lauryl sulfate as an emulsifier, 150 parts of ion-exchanged water as a solvent, and 0.5 parts of ammonium persulfate as a polymerization initiator were put in a 5 MPa pressure-resistant container equipped with a stirrer. The resulting mixture was sufficiently stirred. Thereafter, the temperature thereof was raised to 80° C., and polymerization at the first stage was started.

When the polymerization conversion rate reached 96%, 100 parts of n-butyl acrylate and 1 part of a polymerization initiator were prop-added, and polymerization at the second stage was performed. When the total polymerization conversion rate reached 98%, the mixture was cooled, and the reaction was stopped to obtain a mixture containing a composite polymer particle. A 5% aqueous sodium hydroxide solution was added to this mixture, and the pH thereof was adjusted to 7 to obtain a binder composition containing a desired composite polymer particle.

A slurry composition and an electrode were manufactured in a similar manner to Example 1 except that the binder composition obtained in this way was used.

TABLE 1

| | | | Ex. 1 | Ex. 2 | Ex. 3 | Comp. Ex. 1 | Comp. Ex. 2 |
|---|---|---|---|---|---|---|---|
| Polymerization at the first stage | Polymer composition | SEBS, Amount (part) | 20 | 25 | 30 | — | — |
| | Monomer composition | Styrene, Amount (part) | 80 | 80 | 70 | 100 | 50 |

TABLE 1-continued

|  |  |  | Ex. 1 | Ex. 2 | Ex. 3 | Comp. Ex. 1 | Comp. Ex. 2 |
|---|---|---|---|---|---|---|---|
| Polymerization at the second stage | Monomer composition | BA, Amount (part) | 50 | 30 | 100 | 50 | 100 |
|  |  | MA, Amount (part) | — | 5 | 2 | — | — |
| Evaluation item | Binding property |  | B | A | A | D | A |
|  | Temperature dependency of resistance value (based on 80° C.) | 50° C. | 130 | 118 | 124 | 120 | 136 |
|  |  | 60° C. | 125 | 108 | 115 | 112 | 124 |
|  |  | 70° C. | 112 | 103 | 108 | 103 | 112 |
|  |  | 80° C. | 100 | 100 | 100 | 100 | 100 |
|  |  | 90° C. | 186 | 165 | 154 | 92 | 92 |
|  |  | 100° C. | 176 | 170 | 142 | 90 | 84 |

As indicated in Table 1, an electrode manufactured using a binder composition for a lithium-ion secondary battery electrode, containing a composite polymer particle obtained by polymerizing a monomer solution containing a polymer in an aqueous medium has an excellent binding property and an excellent resistance value.

The invention claimed is:

1. A method for manufacturing a binder composition for a lithium-ion secondary battery electrode comprising:
    a step of dissolving a polymer having a melting point in a range of 50° C. to 150° C. in a monomer and obtaining a monomer solution in which the polymer is dissolved in the monomer; and
    a step of obtaining a composite polymer particle by subjecting the monomer solution to suspension polymerization or emulsion polymerization in an aqueous medium, wherein
    the binder composition contains the composite polymer particle
    the polymer is a hydrogenated copolymer of aromatic vinyl with conjugated diene, and
    the monomer solution is obtained by dissolving the polymer in an amount of 5 to 100 parts by weight with respect to 100 parts by weight of the monomer.

2. The method for manufacturing a binder composition for a lithium-ion secondary battery electrode according to claim 1, wherein the polymer is manufactured by a solution polymerization method.

3. The method for manufacturing a binder composition for a lithium-ion secondary battery electrode according to claim 2, wherein the polymer manufactured by the solution polymerization method is a block copolymer.

4. The method for manufacturing a binder composition for a lithium-ion secondary battery electrode according to claim 1, wherein the composite polymer particle has a core-shell structure in which a shell portion containing a polymer having a binding property is further formed on a surface of the composite polymer particle.

* * * * *